United States Patent [19]

Bella, Jr. et al.

[11] 4,113,552
[45] Sep. 12, 1978

[54] ELUTRIATION LEG AND METHOD

[75] Inventors: Frank Bella, Jr., South Holland; Richard C. Bennett, Park Forest, both of Ill.

[73] Assignee: Whiting Corporation, Harvey, Ill.

[21] Appl. No.: 712,033

[22] Filed: Aug. 5, 1976

[51] Int. Cl.² .......................... B01D 1/30; B01D 9/02
[52] U.S. Cl. ............................... 159/27 A; 23/295 R; 422/245
[58] Field of Search ............ 23/273 R, 295 R, 270 R; 159/27 A

[56] References Cited

U.S. PATENT DOCUMENTS

| | | | |
|---|---|---|---|
| 1,191,108 | 7/1916 | Kestner | 23/273 R |
| 1,434,089 | 10/1922 | Christensen | 23/270 R |
| 1,860,118 | 5/1932 | Ray | 23/273 R |
| 2,035,441 | 3/1936 | Allen | 23/273 R |
| 2,207,347 | 7/1940 | Hughes | 159/27 A |
| 2,232,115 | 2/1941 | Koppers | 23/273 R |
| 2,671,011 | 3/1954 | Ackeren | 23/273 R |
| 3,218,133 | 11/1965 | Ebner | 23/273 R |
| 3,530,924 | 9/1970 | Domning | 23/273 R |
| 3,627,496 | 12/1971 | Hermann | 23/273 R |
| 3,873,275 | 3/1975 | Bennett | 23/273 R |

*Primary Examiner*—Stephen J. Emery
*Attorney, Agent, or Firm*—Lockwood, Dewey, Zickert & Alex

[57] ABSTRACT

The transfer of agitational forces from a main vessel to an elutriation leg connected thereto is effectively minimized with a slurry inlet and liquor outlet device mounted in the upper end of the elutriation leg. The device includes a slurry flow directing member which receives the gravitational flow of slurry from the main vessel and directs such flow in a downward path of reduced cross-sectional area with respect to the cross-sectional area of the elutriation leg for impingement onto a target member mounted below the slurry flow directing member. The downward slurry flow is radially outwardly deflected by the target member to substantially reduce the concentrated downward forces of the slurry which would otherwise tend to disrupt or restrict the formation and maintenance of a fluidized bed in the elutriation leg. The upward flow of elutriating liquor through the leg exits through liquor flow apertures or passages which can have baffle members operatively associated therewith for preventing short circuited slurry flow therethrough.

43 Claims, 11 Drawing Figures

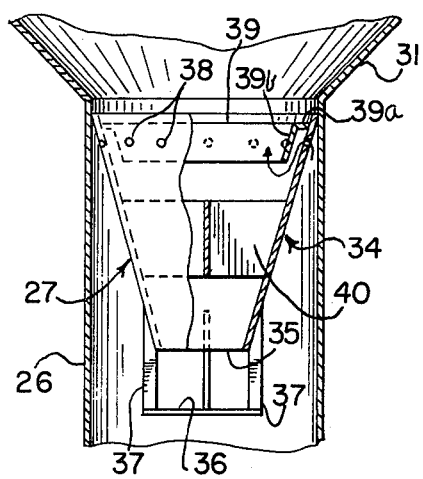
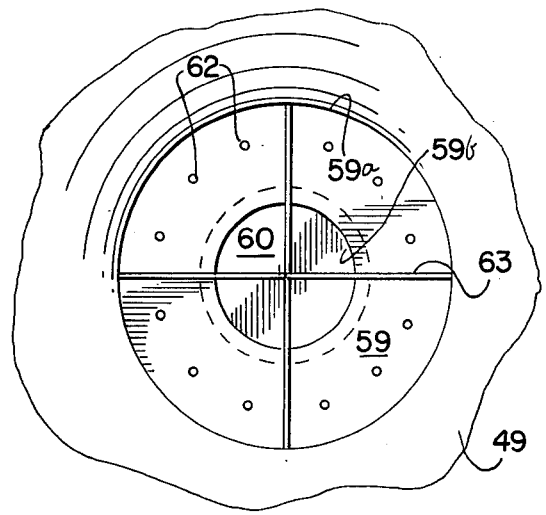
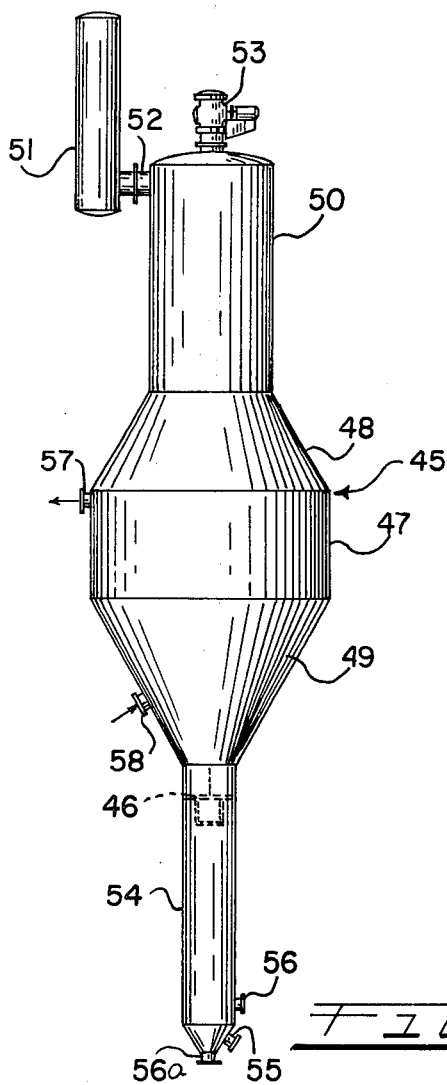

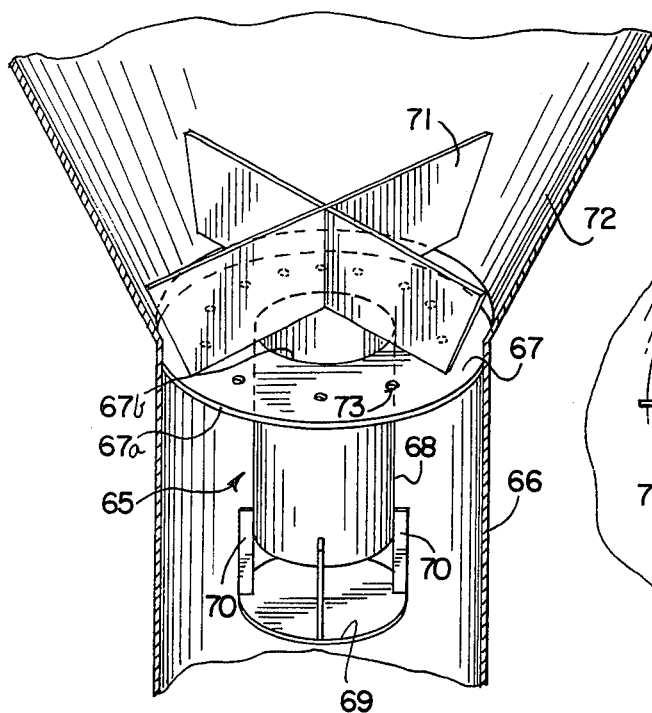
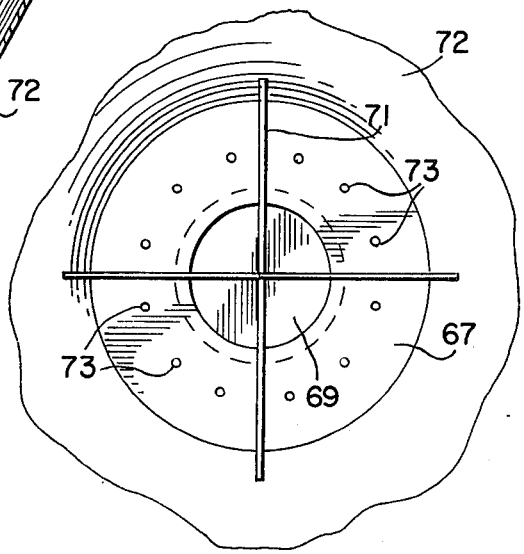
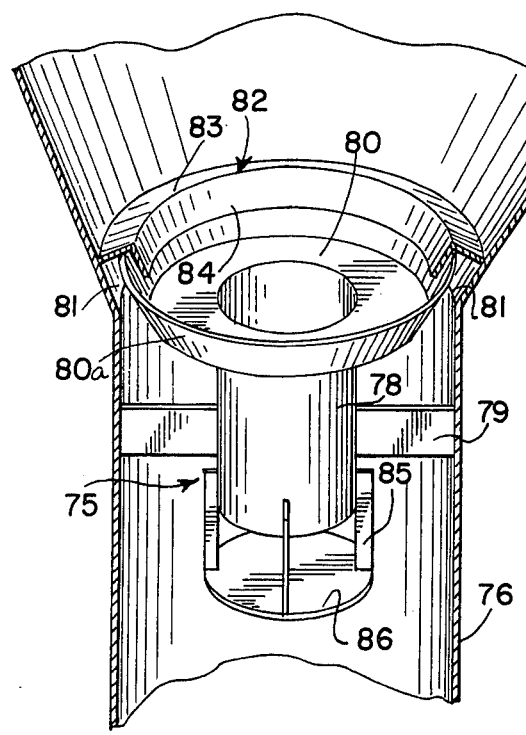
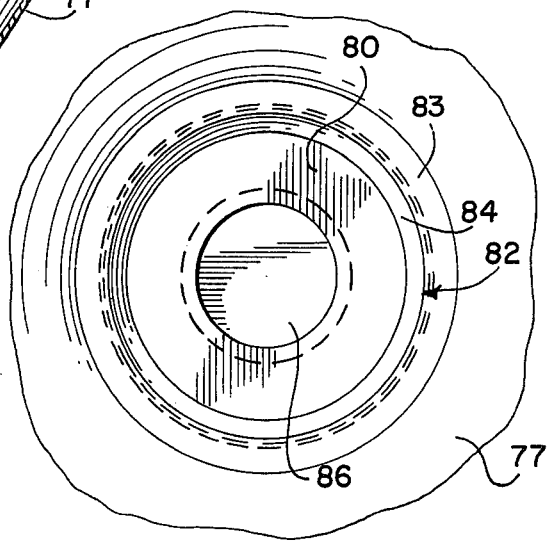

ELUTRIATION LEG AND METHOD

BACKGROUND AND DESCRIPTION OF THE INVENTION

The present invention relates to improvements in apparatus and methods for collection and removal of solids from slurry bodies undergoing agitation and, more particularly, concerns an elutriation apparatus and method characterized by substantially improved efficiency of operation. In this regard, an important aspect of the present invention is specifically directed to an improved elutriation apparatus and method especially suited for evaporator and crystallizer systems wherein the transfer of agitational forces from a main vessel to an elutriation leg directly connected thereto is effectively minimized enabling a body of slurry in the vessel to be subjected to high internal circulation and agitation without disrupting or restricting the formation and maintenance of a fluidized bed in the elutriation leg.

Elutriation legs or columns are commonly of elongated cylindrical construction having an open-ended top in direct communication with a body of slurry contained in a main vessel or evaporating chamber and a bottom end which is normally closed with a dished head or cone. Feed or elutriating liquor is supplied to the bottom of the leg often through a distribution system to obtain an even upward flow, and travels upwardly through the leg. Simultaneously, slurry is gravitationally fed to the top of the elutriation leg and travels downwardly therethrough in countercurrent flow to the elutriating liquor flow for removal from the leg at a location near the bottom end thereof. The upward flow of elutriating liquor is used to fluidize the downward flow of solids.

While elutriation legs are employed in a number of different applications, they are particularly useful in evaporator and crystallizer systems which include a main vessel containing a slurry body undergoing evaporation or cooling wherein salt crystals are formed and then collected and removed in the elutriation leg which is directly connected to the main vessel in pendant relationship therewith. In such evaporator and crystallizer systems, the formation of an efficient fluidized bed in the elutriation leg results in advantageous thickening of the discharged slurry as well as washing and classifying of the salt crystals.

The formation of a thickened or heavy salt discharge is important since it enables removal of maximum amounts of salt crystals with minimum amounts of liquor. Correspondingly, efficient washing of the salt is important since it results in the displacement of body liquor from the salt crystals with elutriating liquor. Normally, the elutriating liquor is weaker in dissolved impurities than the body liquor and, accordingly, displacement of such body liquor from the crystals with the elutriating liquor produces a more desirable crystal product. The classifying ability of an efficiently operating elutriation leg not only offers the advantage of enabling the discharge of larger crystals from the leg but also can be used to classify different types of salt which are present in a given system. For example, in an efficiently operated elutriation leg connected to a salt evaporator, calcium sulfate crystals can be effectively separated from sodium chloride crystals with the result that the finer calcium sulfate crystals are returned back into the slurry body in the main vessel with the elutriating liquor flow.

Agitation in the evaporator or crystallizer main vessel such as, for example, is caused by forced circulation with a pump or agitator, as well as natural circulation, is essential to providing desirable operating conditions in the main vessel body. Transfer of such agitational forces to the elutriation leg, however, produces a disruption and/or restriction in the formation and maintenance of a fluidized bed and, as such, drastically reduces the effectiveness of the elutriation leg.

The present invention provides a method and apparatus by which the transfer of agitational forces in a slurry body contained in a main vessel to an elutriation leg directly connected therewith is effectively minimized so as to provide substantially improved efficiency of such leg and enable the formation and maintenance of a fluidized bed therein.

In accordance with an important aspect of the present invention, an elutriation leg is provided with a novel slurry inlet and liquor outlet device in the upper portion thereof which effectively minimizes the transfer of agitational forces from the main vessel to the elutriation leg. This device includes a slurry flow directing member (preferably of vertically disposed, frustoconical tubular or cylindrical configuration) which receives slurry flow from a main vessel directly connected thereto and discharges such flow in a downward flow path of reduced cross-sectional area with respect to the cross-sectional area of the elutriation leg onto a target member mounted below the slurry flow directing means. The target member is preferably a dish-shaped horizontally disposed component which functions to direct the downward flow of slurry in a radially outward direction to substantially minimize the concentrated downward force of the slurry that would otherwise tend to disrupt the efficient operation of the elutriation leg. Liquor flow directing means located above the target member is provided through which liquor which is relatively free of solids is directed for passage into the main vessel. If desired, a swirl breaker can be provided for dissipating rotational forces imparted to the slurry in the main vessel. In a preferred embodiment, a suitable baffle member, operatively associated with the liquor flow directing means, functions to prevent or at least minimize reverse slurry flow therethrough.

It is, therefore, an object of the present invention to provide an improved apparatus and method for the collection and removal of solids from slurry bodies undergoing agitation.

Another object of the present invention is to provide an improved elutriation apparatus and method characterized by improved efficiency of operation.

Another object of the present invention is to provide an improved elutriation apparatus and method wherein the transfer of agitational forces in a slurry body contained in a main vessel to an elutriation leg directly connected thereto is effectively minimized, enabling a body of slurry in such vessel to be subjected to high internal circulation and agitation without disrupting or restricting the formation and maintenance of a fluidized bed in the elutriation leg.

Another object of the present invention is to provide an improved elutriation apparatus and method wherein the downwardly directed slurry flow forces adjacent the upper end of an elutriation leg are deflected radially outwardly, thereby substantially dissipating those forces which would tend to disrupt the formation and maintenance of a fluidized bed therein.

Another object of the present invention is to provide an improved elutriation apparatus and method wherein passage means is provided for discharge of elutriating liquor from the elutriation leg into a slurry body contained in a main vessel, which passage means is also equipped to at least minimize reverse flow of such slurry from the vessel to the elutriation leg therethrough.

These and other objects of the present invention will be apparent from the following detailed description, taken in conjunction with the accompanying drawings wherein like reference numerals refer to like parts, in which:

FIG. 4 is a vertical sectional view of the elutriation leg slurry inlet and liquor outlet device shown in FIGS. 1, 2 and 3;

FIG. 5 is an elevational view, partially in phantom, of a crystallizer installation having an elutriation leg equipped at its upper end with a slurry inlet and liquor outlet device forming another embodiment of the present invention;

FIG. 6 is an enlarged fragmentary perspective view, partially broken away, of the elutriation leg slurry inlet and liquor outlet device shown in FIG. 5;

FIG. 7 is a fragmentary plan view of the elutriation leg slurry inlet and liquor outlet device shown in FIGS. 5 and 6, taken along the line 7—7 of FIG. 5;

FIG. 8 is an enlarged fragmentary perspective view of an elutriation leg equipped at its upper end with a slurry inlet and liquor outlet device forming a further embodiment of the present invention;

FIG. 9 is a fragmentary plan view of the elutriation leg slurry inlet and liquor outlet device shown in FIG. 8;

FIG. 10 is a fragmentary perspective view, partially broken away, of an elutriation leg equipped at its upper end with a slurry inlet and liquor outlet device forming a still further embodiment of the present invention; and FIG. 11 is a fragmentary plan view of the elutriation leg slurry inlet and liquor outlet device shown in FIG. 10.

Figure 1:
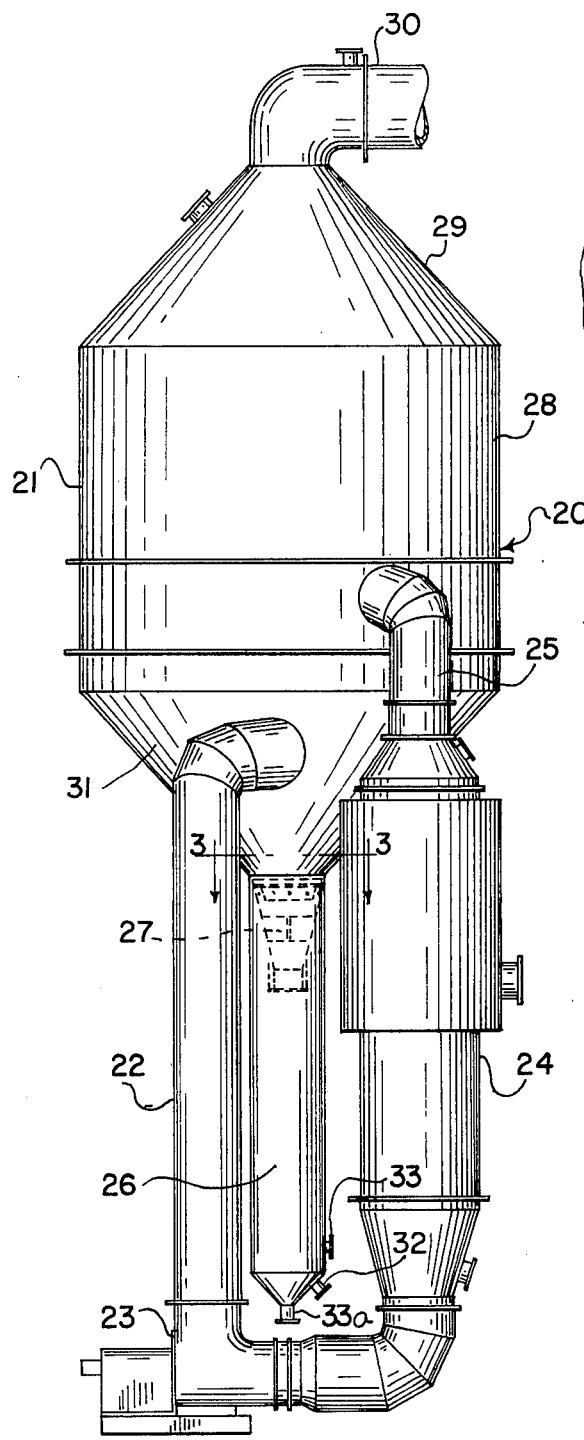
FIG. 1 is an elevational view, partially in phantom, of an evaporator installation having an elutriation leg equipped at its upper end with a slurry inlet and liquor outlet device forming an embodiment of the present invention.
Figure 3:
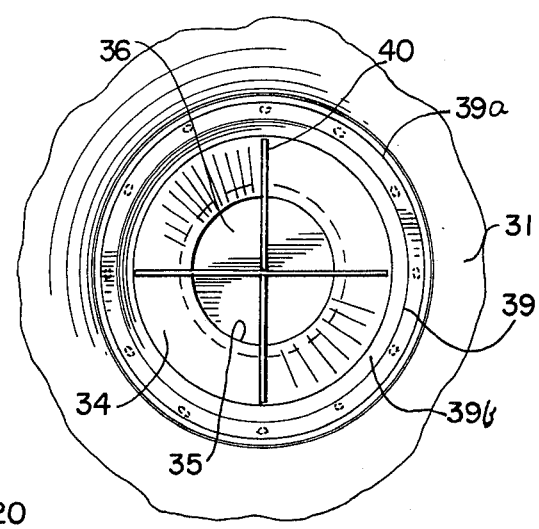
FIG. 3 is a fragmentary plan view of the elutriation leg slurry inlet and liquor outlet device shown in FIGS. 1 and 2, taken along the line 3—3 of FIG. 1.
Figure 2:
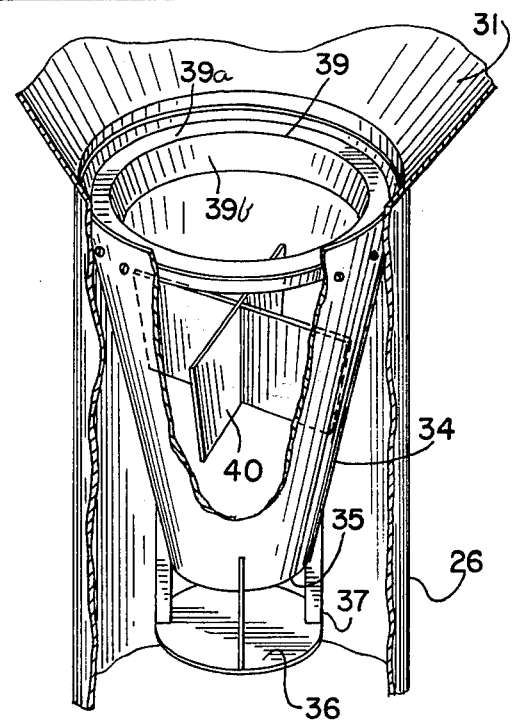
FIG. 2 is an enlarged fragmentary perspective view, partially broken away, of the elutriation leg slurry inlet and liquor outlet device shown in FIG. 1.

Referring to the drawings, and with particular reference to FIGS. 1–4, the reference numeral 20 generally depicts a single effect evaporator which includes an evaporating chamber 21, a recycle process line 22, a circulating pump 23, a heat exchanger 24, a return recycle process line 25, and an elutriation leg 26. In accordance with an important aspect of the present invention, elutriation leg 26 is equipped at its upper end with a slurry inlet and liquor outlet device 27 which is best illustrated in FIGS. 2–4.

As best shown in FIG. 1, the evaporating chamber 21 includes a main, central, elongated, cylindrical body section 28 which extends at its upper end into a tapered dome 29 of frustoconical configuration which, in turn, extends into a vapor outlet 30 that is connected to a condenser or other suitable source of vacuum or reduced pressure. The lower end of elongated cylindrical body section 28 correspondingly extends into a frustoconical section 31 which, in turn, is directly connected to the elutriation leg 26. Feed or elutriating liquor is supplied to the elutriation leg 26 through an inlet 32 and travels upwardly through the leg. Simultaneously, slurry is gravitationally fed to the top of the elutriation leg 26 and travels downwardly therethrough in counter current flow to the elutriating liquor for removal from the leg at outlet 33. In addition, a drain outlet 33a can be provided, as shown in FIG. 1. The upward flow of elutriating liquor in a properly operated bed functions to fluidize the downward flow of solids in the leg.

In the embodiment of the present invention illustrated in FIGS. 1–4, the slurry inlet and liquor outlet device 27 generally includes an outer frusto-conical tubular sleeve 34, the outer surface of the upper end of which is secured in fluid tight sealing relationship with the inside surface of the upper end of the elutriation leg. As shown, the larger open end of frusto-conical sleeve 34 is in direct communication with the interior of evaporating chamber 21 for receiving the gravitational flow of slurry from the evaporating chamber 21. Sleeve 34 tapers downwardly and inwardly to define a bottom open end 35 which is of generally reduced cross-sectional area with respect to the cross-sectional area of the elutriation leg.

A target member 36 is mounted in spaced away but slurry flow alignment with the bottom open end 35 of sleeve 34 and functions to deflect the downward flow of slurry therefrom radially outwardly to substantially dissipate the concentrated downward forces of the slurry which would otherwise tend to disrupt the efficient operation of the elutriation leg. As shown, target member 36 can be of generally dish-shaped or flat configuration and is secured to the lower end of frusto-conical sleeve 34 by a plurality of support bars 37.

The upper end of frusto-conical sleeve 34 is provided with liquor flow directing means which, in the embodiment of FIGS. 1–4, is depicted as a plurality of circumferentially disposed apertures 37 through which liquor passes for discharge into the interior of evaporating chamber 21. Short circuiting of slurry from the interior of the evaporating chamber through the apertures 38 is effectively minimized by means of an internal baffle 39 which is mounted in adjacent and spaced away relation to the apertures 38. As best shown in FIG. 4, baffle 39 includes a radial flange portion 39a which, in the illustrated embodiment, is welded to the upper end of frusto-conical sleeve 34 and a skirt portion 39b which extends downwardly in spaced away relation to the apertures 38. In this regard, it will be noted that the skirt portion of baffle 39 terminates at a level below the level of the apertures 38. Accordingly, elutriation liquor flowing upwardly through the leg 26 will pass in the annular passageway defined between the outer surface of sleeve 34 and the inner surface of elutriation leg 26, through the apertures 38 located adjacent to the upper end of sleeve 34, and around the lower end of baffle skirt 39b for discharge into the interior of evaporating chamber 21.

If desired, a swirl breaker 40 may be provided in the interior of frusto-conical sleeve 34 to dissipate rotational forces imparted to slurry which is supplied to the elutriation leg 26 from the evaporating chamber 21. In the illustrated embodiment, swirl breaker 40 is in the form of a cross-shaped member, the outer portions of which are fixed to the inside wall portions of sleeve 34.

It will be appreciated, however, that the swirl breaker 40 may be placed at other locations in the apparatus such as, for example, in the interior of evaporating chamber 31 immediately above the slurry inlet and liquor outlet device 27 or elsewhere.

In operation, a slurry body undergoing evaporation or cooling is subjected to agitational forces caused by forced circulation through the recycle flow circuit and also by boiling. Slurry flow which is gravitationally discharged into the elutriation leg 26 is initially received in the slurry inlet and liquor outlet device 27 and passes through the frusto-conical sleeve 34 wherein its flow path is restricted to a flow path of reduced cross-sectional area with respect to the cross-sectional area of the elutriation leg itself. This downwardly directed flow of slurry is then discharged onto the horizontally disposed planar dish-shaped target member 36 which deflects the slurry flow radially outwardly to substantially minimize the concentrated downward forces of the slurry which would otherwise tend to disrupt the efficient operation of the elutriation leg. Simultaneously, elutriating liquor which is supplied to the elutriation leg 26 through elutriating liquor inlet 32 passes upwardly through the leg 26 and functions to fluidize the downward flow of solids in the leg. In passing through the fluidized bed contained in the elutriation leg 26, the salt crystals are washed with feed liquor, resulting in the displacement of body liquor therefrom with elutriating or feed liquor which is weaker in dissolved impurities than the body liquor. Substantially solids-free elutriating liquor passes into the annular passageway defined between the outer surface of sleeve 34 and the inner surface of the adjacent portions of elutriation leg 26 from which it is directed through the liquor flow apertures 38, through the annular passageway defined between the inner surface of the upper portion of sleeve 34 and the outer surface of baffle skirt 39b, around the bottom of baffle skirt 39b and into the interior of evaporating chamber 21. In this manner, the transfer of agitational forces from the main vessel or evaporating chamber 21 to the elutriation leg 26 is effectively minimized, providing higher operating efficiencies for the elutriation leg and improved effectiveness of the leg for salt thickening, washing and classifying.

Referring to the embodiment of the present invention illustrated in FIGS. 5–7, the reference numeral 45 generally designates a draft tube baffle crystallizer which, in accordance with the present invention, is equipped with a modified elutriation leg slurry inlet and liquor outlet device 46. The general construction and operation of this crystallizer is described in detail in the co-owned Bernhardi U.S. Pat. No. 3,071,447, the disclosure of which is incorporated herein by reference. As generally set forth in that patent, the crystallizer 45 includes a main tank or vessel 47 which is cylindrical in shape at its mid-portion with upper and lower frusto-conical sections 48 and 49 extending therefrom. An enclosed cylindrical dome section 50 extends from the top of upper frusto-conical section 48 and communicates with a barometric condenser 51 or other suitable vacuum source through a vapor outlet 52 located at the upper end thereof. Supported on top of domed section 50 is a combination motor and propeller drive system 53 which is connected to an internally located propeller (not shown) which serves to create forced circulation in the slurry body contained in the crystallizer 45.

Lower frusto-conical section 49 extends into an elutriation leg 54 which is directly connected thereto in downwardly depending relationship therewith. Elutriation leg 54 is provided at its lower end with an elutriating or feed liquor inlet 55 and slurry removal outlet 56 and drain 56a which can be of like construction and operation to elutriating liquor inlet 32 and slurry removal outlet 33 and drain 33a of the previously described embodiment.

A fines removal outlet is provided for the selective removal of crystalline fines from the interior of the main vessel 47 for discharge to a suitable fines destruction system or other desired processing component. Typically, fines removal via outlet 57 will be sent to a heater (not shown) wherein they are solubilized and then returned to the vessel through a feed inlet 58.

As best shown in FIGS. 6 and 7, the elutriating leg slurry inlet and liquor outlet device 46 includes an annular ring 59, the outer edge 59a of which is mounted in fluid tight relation to the inside surface of elutriating leg 54 and the inner edge 59b of which defines a generally centrally disposed slurry flow passage which is in overlying relation to a generally planar dish-shaped target member 60. As shown, target member 60 is mounted in spaced away relation to the annular ring 59 and supported thereto by a plurality of brackets 61.

Circumferentially disposed around the slurry flow passage defined by the inner edge 59b are a plurality of apertures through which elutriating liquor passes for discharge into the interior of the lower frusto-conical section 49. If desired, a swirl beaker 63, illustratively shown as a cross-shaped member, can be mounted directly onto the upper surface of annular ring 59.

Elutriating leg slurry inlet and liquor outlet device 46 functions in substantially the same way as slurry inlet and liquor outlet device 27 in the previously described embodiment and, accordingly, a detailed description of such operation is not deemed necessary. In general, however, it will be appreciated that slurry from the interior of the draft tube baffle crystallizer 45 will be gravitationally discharged into the elutriation leg 54 wherein it will be directed through the slurry flow passage in annular ring 59 in a downward flow path onto the generally planar dish-shaped surface of dish-shaped target member 60 whereby the downward forces of slurry are radially outwardly directed. Simultaneously, upward liquor flow passes through apertures 62 in the annular ring 59 for discharge into the interior of the crystallizer 45. In this manner, the agitational forces induced in the slurry body contained in the crystallizer effectively minimized, enabling a body of slurry in the crystallizer to be subjected to high internal circulation and agitation without disrupting or restricting the formation and maintenance of a fluidized bed in the elutriation leg 54.

FIGS. 8 and 9 illustrate a further embodiment of the present invention which, as is true of the two previous embodiments, can be utilized in an elutriation leg to provide substantially improved performance through the effective elimination of agitational forces present in a slurry body in direct overlying relation to the elutriation leg. In particular, the slurry inlet and liquor outlet device 65 is mounted to the upper interior portion of an elutriation leg 66 and includes an annular ring 67, the outer edge 67a of which is mounted in fluid tight relation to the interior of the leg 66. A slurry flow passage is defined by the inner edge 67b of ring 67 and directly communicates with a generally cylindrical sleeve 68 having a lower open end which discharges slurry directly onto a dish-shaped target plate 69 mounted in spaced-away slurry flow alignment with the bottom open end of cylinder 68 by means of a plurality of support arms 70. As shown, a swirl breaker, illustratively depicted as a cross-shaped member 71 can be mounted on top of the annular ring 67 in the lower end of the vessel 72 to which the elutriating leg is connected in downwardly depending relation.

Annular ring 67 is provided with a plurality of liquor flow apertures 73 which peripherally surround the slurry flow passage defined by the inner edge 67b of ring 67. Consistent with the mode of operation of the previously described embodiment, slurry from the main vessel 72 is discharged through the slurry flow passage defined by the inner edge 67b of annular ring 67 for impingement onto the target plate 69. In this manner, the slurry flow is radially outwardly deflected, resulting in a substantial reduction of the concentrated downward forces which would otherwise tend to disrupt the efficient operation of the elutriation leg. Simultaneously, liquor passes through the apertures 73 for discharge into the interior of the main vessel 72.

In the embodiment shown in FIGS. 10 and 11, a slurry inlet and outlet device 75 is shown which is mounted to the upper end of an elutriation column 76 which communicates with the lower end of a main vessel 77 in which a slurry body containing solids to be recovered is enclosed. Device 75 includes a generally cylindrical sleeve 78 which is mounted to the upper end of the elutriation leg 76 by means of a plurality of radially extending arms or brackets 79. The upper open end of sleeve 70 extends into an annular ring 80 which terminates in an upwardly and radially outwardly extending flared skirt 80a, the outer surface of which is in spaced away relation with the interior of the outwardly flared walls of the main vessel 77 and defines a generally annular passageway 81 therewith. Short circuiting of slurry from the interior of the main vessel 77 through the passageway 81 is effectively eliminated by means of an annular baffle 82 which is mounted in adjacent and spaced away relation to passageway 81. As shown, baffle 82 includes a radial flange portion 83 which is mounted in fluid tight relation to the interior of the main vessel 77 and in overlying relation to the passageway 81. Radial flange 83 of baffle 82 extends downwardly into a baffle skirt portion 84 which interiorly surrounds the outwardly flared member 80a of annular ring 80 and has a bottom edge which terminates below the upper edge of the flared member 80a.

The lower end of cylindrical sleeve 78 includes a plurality of support brackets 85 to which are mounted a generally planar dish-shaped target member 86. In this manner, slurry which is discharged into the elutriation leg is received in cylindrical sleeve 78 and downwardly directed therethrough onto the generally planar dish-shaped member 86, whereby the downward forces contained therein are directed radially outwardly. It will, of course, be appreciated that the mode of operation of the slurry inlet and liquor outlet device shown in FIGS. 10 and 11 is substantially the same as that discussed above with respect to the aforementioned embodiments.

While in the foregoing specification, for purposes of illustration, specific embodiments have been set forth in detail, it will be apparent to those skilled in the art that many of these details can be varied without departing from the spirit of this invention. Accordingly, the present invention is to be limited only by the scope of the appended claims.

We claim:

1. In an apparatus which includes a main vessel wherein a slurry body containing solids to be recovered therefrom is subjected to agitational forces, which solids are gravitationally discharged as part of a slurry flow into the upper ends of a generably cylindrical elutriation leg mounted directly to the lower end of said main vessel, said leg including a feed inlet through which an elutriation liquor which is relatively weaker in dissolved solids than the liquor portion of said slurry is introduced for upward travel through said leg and into said main vessel, and means for removing solids in said leg adjacent the lower end thereof, the improvement comprising quiescent means for effectively minimizing the transfer of said agitational forces from said main vessel to said elutriation leg so as to provide improved efficiency of operation in said elutriation leg, said quiescent means including: slurry flow directing means including an open-ended sleeve mounted adjacent the upper end of said elutriation leg for directing flow of slurry from said main vessel in a downward flow path which is of generally reduced cross-sectional area with respect to the cross-sectional area of the elutriation leg; target means mounted below said slurry flow directing means and above said feed inlet for deflecting the downward flow of slurry from said slurry flow directing means radially outwardly; liquor flow directing means including a liquor passageway located adjacent the upper portion of said open-ended sleeve through which liquor which is relatively free of solids is directed for passage into said main vessel.

2. The improvement of claim 1 wherein a swirl breaker is provided in said apparatus for dissipating rotational forces imparted to slurry which is supplied to said elutriation leg.

3. The improvement of claim 1 wherein said liquor flow directing means comprises a plurality of apertures.

4. The improvement of claim 1 wherein said liquor flow directing means comprises a generally annular passageway.

5. The improvement of claim 1 wherein reverse flow retarding means is provided on the vessel side of said liquor flow directing means for at least minimizing the flow of slurry from said main vessel to said elutriation leg through said liquor flow directing means.

6. The improvement of claim 1 wherein said open-ended sleeve is of generally tubular configuration and has a substantially constant internal diameter throughout its length.

7. The improvement of claim 1 wherein said liquor passageway comprises a plurality of apertures.

8. The improvement of claim 1 wherein said liquor passageway comprises a plurality of apertures located in an annular ring which surrounds the upper end of said sleeve.

9. The improvement of claim 1 wherein said liquor passageway comprises a plurality of apertures and said liquor flow directing means also including an internal baffle in adjacent and spaced away relation to said apertures, said internal baffle including a radial flange portion which is mounted to said vessel and a skirt portion which extends downwardly in spaced away relation from said apertures, said skirt portion of said internal baffle having a terminus below the level of said apertures.

10. The improvement of claim 1 wherein liquor passageway comprises a generally annular passageway partially defined by an upwardly and radially outwardly extending flared member on said open-ended sleeve adjacent the upper end thereof and said liquor flow directing means also includes an internal baffle in adjacent and inwardly spaced away relation to said passageway, said internal baffle including a radial flange member mounted to said vessel in overlying relation to said passageway and a baffle skirt member extending downwardly in inwardly spaced away relation from said flared member, said baffle skirt member having a terminus below the upper end of said flared member.

11. The improvement of claim 1 wherein said open-ended sleeve is of generally frusto-conical configuration, the larger open end of which being positioned at the upper end of said leg and the wall portion of which tapering downwardly and inwardly to define the smaller open end through which slurry exits from impingement on said target means.

12. The improvement of claim 11 wherein said liquor flow directing means comprises a plurality of apertures in the upper end of said frusto-conical sleeve.

13. The improvement of claim 11 wherein said liquor passageway comprises a plurality of apertures and said liquor flow directing means also includes an internal baffle in adjacent and inwardly spaced away relation to said apertures, said internal baffle including a radial flange portion which is mounted to said vessel and a skirt portion which extends downwardly in spaced away relation to said apertures, said skirt portion of said internal baffle having a terminus below the level of said apertures.

14. The improvement of claim 11 wherein said liquor passageway comprises a generally annular passageway partially defined by an upwardly and radially outwardly extending flared member on said open-ended frusto-conical sleeve adjacent the upper end thereof and said liquor flow directing means also includes an internal baffle which is in adjacent and inwardly spaced away relation to said passageway, said internal baffle including a radial flange member mounted to said vessel in overlying relation to said passageway and a baffle skirt member extending downwardly in inwardly spaced away relation from said flared member, said baffle skirt member having a terminus below the upper end of said flared member.

15. In an apparatus which includes a main vessel wherein a slurry body undergoing evaporation or cooling is subjected to agitational forces and in which crystalline solids are formed, which solids are gravitationally discharged as part of a slurry flow into a generally cylindrical elutriation leg of substantially uniform cross-sectional area which is directly connected to the lower end of said main vessel in downwardly depending relationship therewith, said leg including a feed inlet through which an elutriation liquor which is relatively weaker in dissolved solids than the liquor portion of said slurry is introduced for upward travel through said leg and into said main vessel, and means for removing solids in said leg adjacent the lower end thereof, the improvement comprising quiescent means for effectively minimizing the transfer of agitational forces from said main vessel to said leg so as to provide improved efficiency of operation in said elutriation leg, said quiescent means including a slurry flow directing member which includes an open ended sleeve mounted to the upper end of said elutriation leg for directing the flow of slurry from said main vessel in a downward flow path which is of generally reduced cross-sectional area with respect to the cross-sectional area of said elutriation leg; a generally planar target member generally horizontally disposed and mounted below said slurry flow directing member and above said feed inlet for deflecting the downward flow of slurry from said slurry flow directing means radically outwardly to at least minimize the concentrated downward force of said slurry which would otherwise tend to disrupt the efficient operation of said elutriation leg; liquor flow directing means including a liquor passageway located adjacent the upper portion of said open-ended sleeve through which liquor which is substantially free of solids is directed for passage into said main vessel; and, reverse flow retarding means located on the vessel side of said liquor flow directing means for at least minimizing the flow of slurry from said main vessel to said elutriation leg through said liquor flow directing means.

16. The improvement of claim 15 wherein a swirl breaker is provided in said apparatus for dissipating rotational forces imparted to slurry which is supplied from said vessel to said elutriation leg.

17. The improvement of claim 16 wherein said swirl breaker is mounted to the interior of said main vessel immediately above said slurry flow directing member.

18. The improvement of claim 16 wherein said swirl breaker is mounted directly to said quiescent means.

19. The improvement of claim 15 wherein said liquor flow directing means comprises a plurality of apertures.

20. The improvement of claim 15 wherein said liquor flow directing means comprises a generally annular passageway.

21. The improvement of claim 15 wherein said slurry flow directing means comprises an open-ended sleeve, said sleeve having an outer surface which cooperates with the inside surface of the elutriation leg outer wall to define a liquor flow passageway in direct communication with said liquor flow directing means.

22. The improvement of claim 21 wherein the interior of said open-ended sleeve is of generally tubular configuration and has a substantially constant internal diameter throughout its length.

23. The improvement of claim 21 wherein said liquor flow directing means comprises a plurality of apertures.

24. The improvement of claim 21 wherein said liquor flow directing means comprises a plurality of apertures located in an annular ring which surrounds the upper end of said sleeve.

25. The improvement of claim 21 wherein said liquor flow directing means comprises a plurality of apertures adjacent the upper portion of said open-ended sleeve and an internal baffle is provided which is in adjacent and spaced away relation to said apertures, said baffle including a radial flange portion which is mounted to said vessel and a skirt portion which extends downwardly in spaced away relation from said apertures, said skirt portion of said internal baffle having a terminus below the level of said apertures.

26. The improvement of claim 21 wherein said liquor flow directing means comprises a generally annular passageway partially defined by an upwardly and radially outwardly extending flared member on said open-ended sleeve and an internal baffle is provided which is in adjacent and spaced away relation to said passageway, said internal baffle including a radial flange member mounted to said vessel in overlying relation to said passageway and a baffle skirt member extending downwardly in spaced away relation from said flared member, said baffle skirt member having a terminus below the upper end of said flared member.

27. The improvement of claim 21 wherein said open-ended sleeve is of generally frusto-conical configuration, the larger open end of which is positioned at the upper end of said elutriation leg and the wall portion of which tapers downwardly and inwardly to define the smaller open end through which slurry exits for impingement on said generally planar target member.

28. The improvement of claim 26 wherein said liquor flow directing means comprises a plurality of apertures located in the upper end of said frusto-conical sleeve.

29. The improvement of claim 27 wherein said liquor flow directing means comprises a plurality of apertures adjacent the upper portion of said open-ended sleeve and an internal baffle is provided which is in adjacent and spaced away relation to said apertures, said internal baffle including a radial flange portion which is mounted to said vessel and a skirt portion which extends downwardly in spaced away relation from said apertures, said skirt portion of said internal baffle having a terminus below the level of said apertures.

30. The improvement of claim 27 wherein said liquor flow directing means comprises a generally annular passageway partially defined by an upwardly and radially outwardly extending flared member adjacent the upper end of said frusto-conical sleeve and an internal baffle is provided which is in adjacent and spaced away relation to said passageway, said internal baffle including a radial flange member mounted to said vessel in overlying relation to said passageway and a baffle skirt member extending downwardly in spaced away relation from said flared member, said baffle skirt member having a terminus below the upper end of said flared member.

31. In an apparatus which includes a main vessel wherein a slurry body undergoing evaporative cooling is subjected to agitational forces which circulate said slurry in a predetermined flow pattern in said vessel, crystalline solids being formed in said slurry body which solids are gravitationally discharged as part of a slurry flow into a generally cylindrical elutriation leg of substantially uniform cross-sectional area directly connected to the lower end of said main vessel in downwardly depending relationship therewith, said leg including a feed inlet through which an elutriation liquor which is relatively weaker in dissolved solids than the liquor portion of said slurry is introduced for upward travel through said leg and into said main vessel, and means for removing solids in said leg adjacent the lower end thereof, the improvement comprising quiescent means for effectively minimizing the transfer of said agitational forces from said main vessel to said elutriation leg so as to provide improved efficiency of operation in said leg, said quiescent means including: an open-ended sleeve mounted to the upper end of said elutriation leg for directing the flow of slurry from said main vessel in a downward flow path which is of generally reduced cross-sectional area with respect to the cross-sectional area of the elutriation leg; a generally horizontally disposed planar dish-shaped target member mounted below said sleeve and above said feed inlet for deflecting the downward flow of slurry from said slurry flow directing means radially outwardly to substantially minimize the concentrated downward forces of said slurry which would otherwise tend to disrupt the efficient operation of said elutriation leg; liquor flow directing means located above said generally planar dish-shaped member through which liquor which is substantially free of solids is directed for passage into said main vessel; reverse flow retarding means on the vessel side of said liquor flow directing means for at least minimizing the flow of slurry from said main vessel to said elutriation leg through said liquor flow directing means; and, means for dissipating rotational forces imparted to slurry which is supplied to said elutration leg from said vessel.

32. The improvement of claim 31 wherein said open-ended sleeve is of generally tubular configuration and has a substantially constant internal diameter throughout its length.

33. The improvement of claim 31 wherein said liquor flow directing means comprises a plurality of apertures adjacent the upper end of said open-ended sleeve and an internal baffle is provided which is adjacent and in spaced away relation to said apertures, said internal baffle including a radial flange portion which is mounted to said vessel and a skirt portion which extends downwardly in spaced away relation from said apertures, said skirt portion of said internal baffle having a terminus below the level of said apertures.

34. The improvement of claim 31 wherein said liquor flow directing means is a generally annular passageway defined by an upwardly and radially outwardly extending flared member adjacent the upper end of said open-ended sleeve and an internal baffle is provided which is in adjacent and spaced away relation to said passageway, said internal baffle including a radial flange member mounted to said vessel in overlying relation to said passageway and a baffle skirt member extending downwardly in spaced away relation from said flared member, said baffle skirt member having a terminus below the upper end of said flared member.

35. The improvement of claim 31 wherein said open-ended sleeve is of generally frusto-conical configuration, the larger open end of which is positioned at the upper end of said elutriation leg and the wall portion of which tapers downwardly and inwardly therefrom to define the smaller open end through which slurry exits for impingement on said generally planar dish-shaped target member.

36. The improvement of claim 35 wherein said liquor flow directing means comprises a plurality of apertures in the upper end of said frusto-conical sleeve.

37. The improvement of claim 35 wherein said liquor flow directing means comprises a plurality of apertures adjacent the upper end of said open-ended sleeve and an internal baffle is provided which is in adjacent and spaced away relation to said apertures, said internal baffle including a radial flange portion which is mounted to said vessel and a skirt portion which extends downwardly in spaced away relation from said apertures, said skirt portion of said internal baffle having a terminus below the level of said apertures.

38. The improvement of claim 35 wherein said liquor flow directing means comprises a generally annular passageway defined by an upwardly and radially outwardly extending flared member adjacent the upper end of said open-ended frusto-conical sleeve and an internal baffle is provided which is in adjacent spaced away relation to said passageway, said internal baffle including a radial flange mounted to said vessel in overlying relation to said passageway and a baffle skirt member extending downwardly in spaced away relation from said flared member, said baffle skirt member having a terminus below the upper end of said flared member.

39. The improvement of claim 31 wherein said liquor flow directing means comprises a plurality of apertures.

40. The improvement of claim 39 wherein said apertures are located in an annular ring which surrounds the upper end of said sleeve.

41. In an apparatus which includes a main vessel wherein a slurry body containing solids to be recovered therefrom is subjected to agitational forces, which solids are gravitationally discharged as part of a slurry flow into an elutriation leg mounted directly to said main vessel, the improvement comprising quiescent means for effectively minimizing the transfer of said agitational forces from said main vessel to said elutriation leg so as to provide improved efficiency of operation in said elutriation leg, said quiescent means including: slurry flow directing means including an open-ended sleeve of generally frusto-conical configuration mounted adjacent the upper end of said elutriation leg for directing flow of slurry from said main vessel in a downward flow path which is of generally reduced cross-sectional area with respect to the cross-sectional area of the elutriation leg; vertical breaker baffles in said elutriation leg in operative association with said open-ended sleeve for dissipating rotational forces imparted to slurry which is supplied to said elutriation leg; target means mounted below said slurry flow directing means for deflecting the downward flow of slurry from said slurry flow directing means radially outwardly; and, liquor flow directing means including a plurality of circumferentially arranged apertures located in the upper portion of said elutriation leg above said target means through which liquor which is relatively free of solids is directed for passage into said main vessel, said liquor flow directing means also including an internal baffle which is in adjacent and inwardly spaced away relation to said apertures, said internal baffle including a radial flange portion and a skirt portion which extends downwardly in inwardly spaced relation to said apertures and which has a terminus below the level of said apertures.

42. In an apparatus which includes a main vessel wherein a slurry body undergoing evaporation or cooling is subjected to agitational forces and in which crystalline solids are formed, which solids are gravitationally discharged as part of a slurry flow into an elutriation leg which is directly connected to said main vessel in downwardly depending relationship therewith, the improvement comprising quiescent means for effectively minimizing the transfer of agitational forces from said main vessel to said leg so as to provide improved efficiency of operation in said elutriation leg, said quiescent means including a slurry flow directing member including an open-ended sleeve of generally frusto-conical configuration mounted to the upper end of said elutriation leg for directing the flow of slurry from said main vessel in a downward flow path which is of generally reduced cross-sectional area with respect to the cross-sectional area of said elutriation leg; vertical breaker baffles in said elutriation leg in operative association with said open-ended sleeve for dissipating rotational forces imparted to slurry which is supplied to said elutriation leg; a generally planar target member generally horizontally disposed and mounted below said slurry flow directing member for deflecting the downward flow of slurry from said slurry flow directing means radially outwardly to at least minimize the concentrated downward force of said slurry which would otherwise tend to disrupt the efficient operation of said elutriation leg; liquor flow directing means including a plurality of circumferentially arranged apertures located in the upper portion of said elutriation leg above said generally planar member through which liquor which is substantially free of solids is directed for passage into said main vessel; and, reverse flow retarding means located on the vessel side of said liquor flow directing means for at least minimizing the flow of slurry from said main vessel to said elutriation leg through said liquor flow directing means, said reverse flow retarding means including an internal baffle which is in adjacent and inwardly spaced away relation to said apertures, said internal baffle including a radial flange portion and a skirt portion which extends downwardly in inwardly spaced relation to said apertures and which has a terminus below the level of said apertures.

43. In an apparatus which includes a main vessel wherein a slurry body undergoing evaporative cooling is subjected to agitational forces which circulate said slurry in a predetermined flow pattern in said vessel, crystalline solids being formed in said slurry body which solids are gravitationally discharged as part of a slurry flow into an elutriation leg directly connected to said main vessel in downwardly depending relationship therewith, the improvement comprising quiescent means for effectively minimizing the transfer of said agitational forces from said main vessel to said elutriation leg so as to provide improved efficiency of operation in said leg, said quiescent means including: an open-ended sleeve of generally frusto-conical configuration mounted to the upper end of said elutriation leg for directing the flow of slurry from said main vessel in a downward flow path which is of generally reduced cross-sectional area with respect to the cross-sectional area of the elutriation leg; vertical breaker baffles in said elutriation leg in operative association with said open-ended sleeve for dissipating rotational forces imparted to slurry which is supplied to said elutriation leg; a generally horizontally disposed planar dish-shaped target member mounted below said sleeve for deflecting the downward flow of slurry from said slurry flow directing means radially outwardly to substantially minimize the concentrated downward forces of said slurry which would otherwise tend to disrupt the efficient operation of said elutriation leg; liquor flow directing means including a plurality of circumferentially spaced apertures located in the upper portion of said elutriation leg above said generally planar dish-shaped member through which liquor which is substantially free of solids is directed for passage into said main vessel; and, reverse flow retarding means on the vessel side of said liquor flow directing means for at least minimizing the flow of slurry from said main vessel to said elutriation leg through said liquor flow directing means, said reverse flow retarding means including an internal baffle which is in adjacent and inwardly spaced away relation to said apertures, said internal baffle including a radial flange portion and a skirt portion which extends downwardly in inwardly spaced relation to said apertures and which has a terminus below the level of said apertures.

* * * * *